(12) United States Patent
Bates et al.

(10) Patent No.: US 7,114,533 B2
(45) Date of Patent: Oct. 3, 2006

(54) DENSIFICATION OF AERATED POWDERS USING POSITIVE PRESSURE

(75) Inventors: James William Bates, Armory, MS (US); Thomas Ian Brownbridge, Oklahoma City, OK (US)

(73) Assignee: Kerr-McGee Chemical, LLC, Oklahoma City, OK (US)

( * ) Notice: Subject to any disclaimer, the term of this patent is extended or adjusted under 35 U.S.C. 154(b) by 0 days.

(21) Appl. No.: 10/949,691

(22) Filed: Sep. 23, 2004

(65) Prior Publication Data

US 2005/0036900 A1 Feb. 17, 2005

Related U.S. Application Data

(63) Continuation of application No. 10/322,565, filed on Dec. 16, 2002, now abandoned.

(51) Int. Cl.
*B65B 1/20* (2006.01)

(52) U.S. Cl. .............................. 141/12; 141/9; 141/73; 141/80

(58) Field of Classification Search ................. 141/12, 141/73, 71, 67, 65, 59, 267, 256, 286; 222/373, 222/394, 214, 490, 494
See application file for complete search history.

(56) References Cited

U.S. PATENT DOCUMENTS

| | | |
|---|---|---|
| 3,195,586 A | 7/1965 | Vogt |
| 3,260,285 A | 7/1966 | Vogt |
| 3,586,066 A | 6/1971 | Brown |
| 3,788,368 A | 1/1974 | Geng et al. |
| 3,913,795 A | 10/1975 | Croucher et al. |
| 4,145,045 A | 3/1979 | Pocklington |
| 5,109,893 A | 5/1992 | Derby |
| 5,137,665 A | 8/1992 | Tarry |
| 5,169,572 A | 12/1992 | Matthews |
| 5,234,037 A | 8/1993 | Derby |
| 5,244,019 A | 9/1993 | Derby |
| 5,275,215 A | 1/1994 | Derby |
| 5,513,682 A | 5/1996 | Derby |
| 5,518,048 A | 5/1996 | Derby |
| 5,531,252 A | 7/1996 | Derby et al. |
| 5,538,053 A | 7/1996 | Derby |
| 5,711,215 A | 1/1998 | Sextl et al. |
| 5,749,401 A | 5/1998 | Shinya et al. |
| 6,139,617 A | 10/2000 | Halko et al. |

(Continued)

FOREIGN PATENT DOCUMENTS

CA 2052339 7/1992

(Continued)

OTHER PUBLICATIONS

Joseph Marinelli, "Why We Hate Titanium Dioxide," Undated, Solids Handling Technologies, Internet www.solidshandlingtech.com/articletitanium.htm.

(Continued)

*Primary Examiner*—Khoa D. Huynh
(74) *Attorney, Agent, or Firm*—McAfee & Taft

(57) ABSTRACT

A process for increasing the bulk density of an aerated powder is provided. The powder is placed in a container. The container is then closed and the gas pressure within the container is increased to a level above atmospheric pressure and at a rate sufficient to cause the powder to compact before a substantial portion of said pressurization gas diffuses into said powder. In one embodiment, the process is utilized to increase the bulk density of an aerated, free-flowing titanium dioxide pigment. Apparatus for carrying out the process is also provided.

23 Claims, 4 Drawing Sheets

U.S. PATENT DOCUMENTS 6,207,131 B1    3/2001    Magyar et al.

FOREIGN PATENT DOCUMENTS

EP    0 590 523 A2    4/1994
GB    987165    3/1965

OTHER PUBLICATIONS

Lee Won Joon, "Re: Want to increase the bulk density?", Aug. 6, 2001, Powder and Bulk Dot Com Materials Handling Help Forum, Internet www.powderandbulk.com/_forum2/000000bb.htm.

Lyn Bates, "Re: Want to increase the bulk density?", Jun. 16, 2001, Powder and Bulk Dot Com Materials Handling Help Forum, Internet www.powderandbulk.com/_forum2/000000bf.htm.

2001, Model BG-700 De-Aerator, International Headquarters B.A.G. Equipment by Premier Tech, Internet www.premiertech.com/bagequip/main/htdocs/specialty/deaerator/index/html.

2001, SEP-500 Series Deaerator Bagger, Premier Tech, Internet www.premiertech.com/unites/ptp/prod/sep500.htm.

Undated, Untitled document, ajusystem.com, Internet @ www.ajusystem.com/english/total/data2_9.html.

Undated, Speification Guide Spherical Disc Valves, Gemcovalve.com, Internet www.gemcovalve.com/prod/prntspec/air4.html.

DENSIFICATION OF AERATED POWDERS USING POSITIVE PRESSURE

This application is a continuation application of application Ser. No. 10/322,565 filed on Dec. 16, 2002 now abandoned.

BACKGROUND OF THE INVENTION

The present invention relates to methods and apparatus for increasing the bulk density of aerated powders. By way of example only, the invention can be utilized to increase the bulk density of highly aerated, free-flowing inorganic metal oxide powders with considerable commercial significance, for example, titanium dioxide pigments, complex metal oxides of the type presently being employed in primary and secondary rechargeable batteries (typically comprising lithium metal oxides) and blends of such complex metal oxides with various other components of a cathode composition of a battery.

Handling and containing fine, highly aerated powders can be problematic in many respects. For example, filling a bag or other container to capacity with a highly treated titanium dioxide pigment (for example, one designed for use in water-based latex paints) can be difficult to accomplish in an efficient manner without first deaerating the pigment. Due to the relatively low bulk density of the pigment, the container can generally be filled to only 80 to 90% of its capacity. On standing, air entrapped in the pigment will slowly rise through the tortuous pathways defined between gravitationally settling pigment particles, in the process increasing the bulk density of the pigment and allowing additional pigment to be added to the container. However, in a continuous manufacturing and packaging process, the additional time and handling required to fill the container to capacity makes the process inefficient. Further, it can be difficult to impart a consistent, predetermined amount of pigment to each bag in a continuous bagging process. Similarly, filling a battery compartment or shell to capacity or with an exact amount of battery-active material (e.g., cathode material) can be difficult to achieve due to air entrapped in the material.

Various processes have been utilized to deaerate and compact a free-flowing powder. For example, the powder container has been placed on top of a device that allows the container to be shaken and/or vibrated as the container is filled. A similar technique involves placing a vibrating rod into the container in order to cause entrapped air to dissipate. Additional methods utilized in the past include a compression device for compressing the container and powder therein in order to squeeze out air entrained in the powder, and placing a porous pipe connected to a vacuum system into the container during the filling process to evacuate the entrained air. All of these processes have serious drawbacks. For example, although removing entrained air with a porous pipe works for a short time, the pores in the pipe ultimately become blocked due to the fine particle size of many powders.

One technique that has been used commercially over the years is vacuum densification. In a vacuum densification process, the powder to be deaerated is placed in a container that is connected to a vacuum source. A vacuum is then pulled to whatever level is desired. Upon attaining the desired vacuum level, the valve controlling the vacuum source is closed and a second valve into the container is opened allowing the pressure within the container to rapidly equilibrate back to atmospheric pressure. This process causes the powder to compact.

Unfortunately, like the other powder deaeration processes utilized heretofore, vacuum densification has its drawbacks. For example, vacuum systems require an elaborate filter system and are generally somewhat expensive to put in place. Many powder manufacturing plants do not otherwise have vacuum systems in place. Also, vacuum systems are limited to atmospheric pressure (approximately 15 psig (1 kg/sq. cm, gauge)).

BRIEF SUMMARY OF THE INVENTION

In a vacuum densification process, the powder densifies to a small extent as the pressure within the vacuum chamber decreases. However, it is the rapid in-flow of air into the evacuated container achieved by releasing the vacuum that ultimately causes the deaerated material to compact to a significant degree. If the vacuum is released at a sufficient rate, the in-rush of air on top of the pigment is too fast to allow the air to diffuse back between the particles, thereby forcing the pigment into a smaller volume.

It has now been discovered that rapid pressurization of the gas (e.g., air) in a closed vessel also causes a highly aerated powder within the vessel to become densified. Accordingly, the invention provides a process for increasing the bulk density of an aerated powder based on positive pressure. As discussed below, the use of a positive pressure system to achieve the desired powder densification has many advantages.

In one aspect, the invention provides a process for increasing the bulk density of an aerated powder. In accordance with the process, the powder is placed in a container. The gas pressure in the area of the container containing the powder is then increased to a level above atmospheric pressure at a rate sufficient to cause the powder to compact before a substantial portion of the pressurization gas diffuses into the powder. As explained below, the level above atmospheric pressure to which the gas pressure must be increased and the rate of increase required in order to achieve a significant degree of powder compaction will vary depending upon the type of powder, the size of the container and other parameters.

For example, in one application, the inventive process can be used to place a predetermined volume of powder into a bag or other receptacle. The powder is placed in a container. The gas pressure is then increased in the area of the container containing the powder to a level above atmospheric pressure at a rate sufficient to increase the bulk density of the powder to a predetermined level. A predetermined amount of the compacted powder is then removed from the container and placed in the receptacle. This allows, for example, a consistent, predetermined amount of powder to be placed in each bag in a continuous bagging process.

In one embodiment, the gas pressure in the area of the container containing the powder is increased to a level above atmospheric pressure by injecting a gas into the container. The gas is injected into the container at a rate sufficient to cause the powder to compact before a substantial portion of the gas diffuses into the powder. A variety of gases, including air, can be used, provided that the gas selected does not adversely react with the powder or otherwise negatively affect either the process or the apparatus used to carry out the process. Preferably, the injection gas is an inert gas, air, nitrogen, oxygen, carbon dioxide or chlorine gas.

Examples of fine, highly aerated powders that can be densified in accordance with the inventive process include inorganic metal oxide powders such as inorganic pigments (e.g., titanium dioxide pigments) and battery-active materials. Such battery-active materials include the inorganic metal oxide and metal phosphate powders used in primary and secondary rechargeable batteries, for example, lithium metal oxides and lithium metal phosphates including those wherein the metal is vanadium, manganese, nickel, cobalt, iron or combinations of such metals. These battery-active materials may or may not have lithium present in their crystalline structure. The invention is particularly suitable for densifying lithium vanadium oxides. Also, blends of battery-active materials with other components for use in a cathode composition may also be densified in accordance with the inventive process, as exemplified below.

In another embodiment, the inventive process for increasing the bulk density of an aerated powder comprises placing the powder in a container, the container having a first end and a second end opposing the first end. The gas pressure in the area of the container containing the powder is then increased to a level above atmospheric pressure at a rate sufficient to cause the powder to compact against the second end of the container before a substantial portion of the pressurization gas diffuses into the powder. Next, the second end of the container is opened thereby causing the container to depressurize and the powder to be expelled from the container through the second end of the container.

The invention also includes a process for preparing a slurry. In accordance with the process, the powder is first milled or otherwise processed. The milling or other processing procedure typically causes the powder to become aerated. Prior to allowing the powder to fully settle, the bulk density of the powder is increased by deaerating the powder. After the bulk density of the powder is increased, the powder is dispersed in a liquid medium. The deaeration step allows the powder to be quickly dispersed in the liquid medium (i.e., the powder can be quickly dispersed into the liquid medium even though it has not been allowed to fully settle). Unless the powder is deaerated (either naturally over time or in accordance with the invention), dispersing large amounts of the powder into a liquid medium in a timely manner can be difficult to achieve. The powder is preferably deaerated in accordance with the inventive positive pressure deaeration system described above.

For example, the above process can be used to disperse freshly fluid energy milled titanium dioxide pigment into a suitable liquid, such as water, to form a concentrated pigment slurry. The increased bulk density of the pigment speeds up the slurry dispersion process by increasing the rate at which the pigment will "wet" into the slurry. The concentrated pigment slurry can then be admixed into paint formulations and the like in a relatively quick and easy manner.

In another aspect, the invention includes apparatus for carrying out the inventive process. In one embodiment, the apparatus comprises a container for containing the powder under pressure, the container having a first end and a second end opposing the first end. Pressurization means are associated with the container for increasing the pressure in the area of the container containing the powder to a level above atmospheric pressure at a rate sufficient to cause the powder to compact before a substantial portion of the pressurization gas diffuses into the powder. In one embodiment, the pressurization means comprises means for injecting a gas into the container, and a source of compressed gas.

In another embodiment, the inventive apparatus comprises: i) a cylinder with first and second opposing ends defining an inlet and an outlet, respectively; ii) a rotary containment device positioned within the cylinder in a hub-and-spoke type arrangement whereby aerated powder can be added through the inlet to powder containment areas defined by adjacent "spokes" within the cylinder; and iii) pressurization means comprising means for injecting a gas into the container, and a source of compressed gas. The device can be rotated such that powder in the powder containment areas is densified by the inputting of a pressurized gas through the pressurization means. The device can then be further rotated such that densified powder is removed from the cylinder through the outlet.

BRIEF DESCRIPTION OF THE DRAWINGS

FIG. 6 is a graph corresponding to Example IV set forth below.

DETAILED DESCRIPTION OF PREFERRED EMBODIMENTS OF THE INVENTION

The invention provides a process for increasing the bulk density of an aerated powder. As used herein and in the appended claims, a powder means a solid, dry material of very small particle size ranging down to colloidal dimensions (e.g., 0.01 microns). As used herein and in the appended claims, an "aerated" powder means a powder having air or some other gas entrapped among the particles forming the powder. The bulk density of a powder means the bulk density of the powder as determined by the method described and shown in Example I below.

Figure 1:
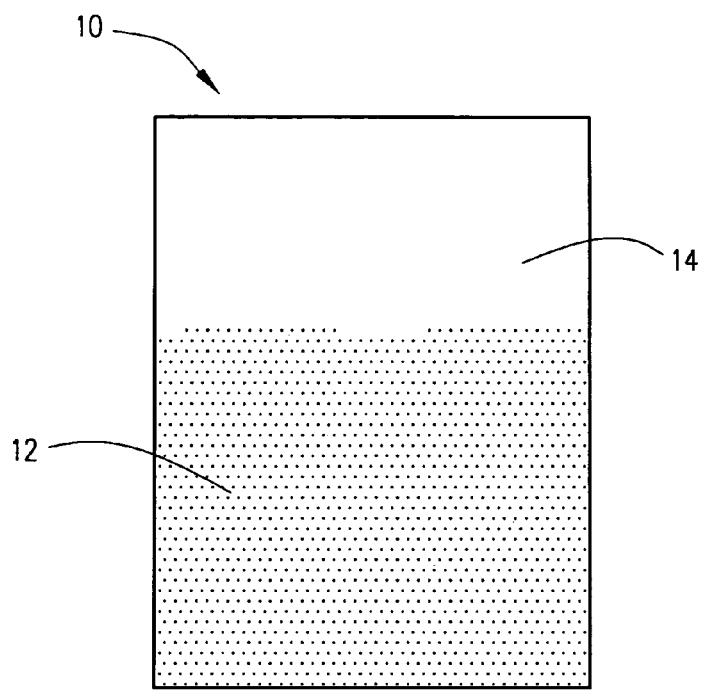
FIGS. 1 and 2 are section views of a simple container illustrating the positive pressure system of the invention.
Figure 2:
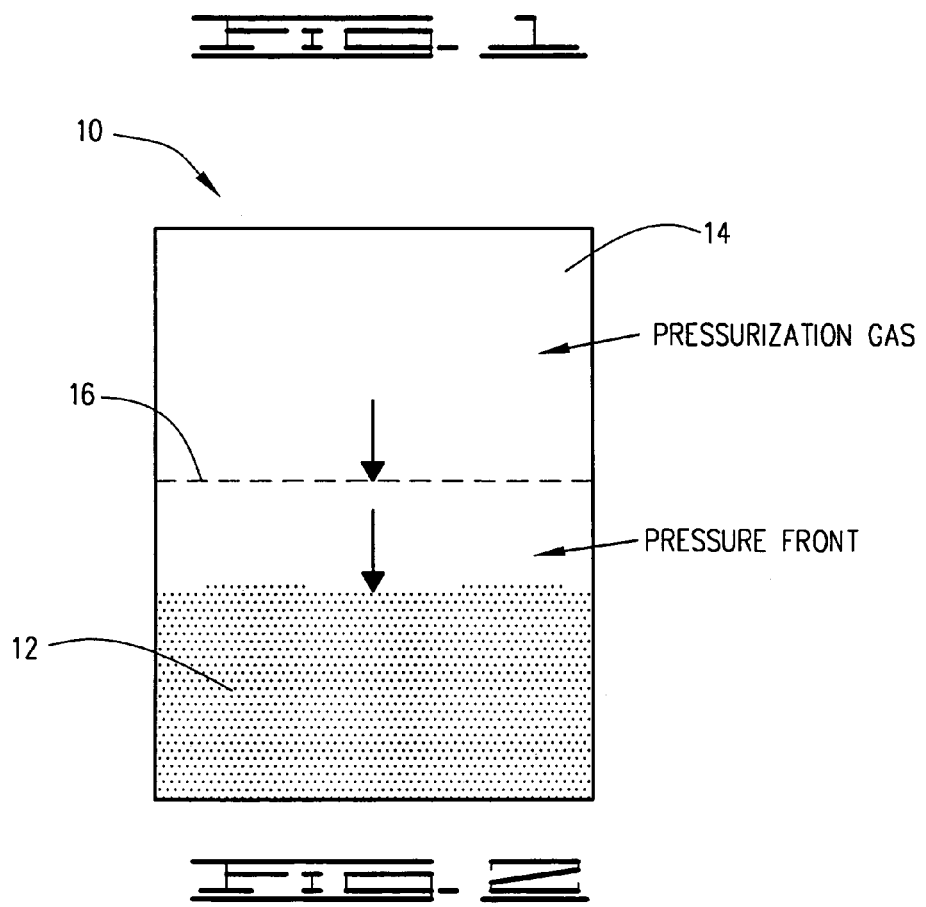

Referring now to FIGS. 1 and 2, the general mechanism of the inventive process is illustrated and described. FIG. 1 illustrates a container 10 containing an aerated powder 12 prior to densification. As shown by FIG. 2, rapidly increasing the gas pressure in the area 14 of the container 10 containing the powder 12 (in this case the area 14 is the whole interior of the container 10) to a level above atmospheric pressure causes the powder to compact before a substantial portion of the pressurization gas diffuses into the powder. Without being limiting of the invention in any way, it is expected in mechanistic terms that a pressure front or pressure wave (indicated by the dotted line 16) is created which forces the particles 12 together and forces out the air entrapped between the powder particles that would otherwise have to be displaced over time by the gravitational settling of the particles 12.

The compacted powder 12 can then be more efficiently processed. For example, in addition to being easier to handle, the powder can be more efficiently packaged (e.g., packaging size can be standardized). The compacted powder 12 can also, for example, be more efficiently placed into a shell or other vessel (e.g., a battery shell). In most battery applications, the more densely the active materials are compacted the greater the charge density of the battery, i.e., compaction of the battery-active materials results in a better battery.

In accordance with the inventive process, the powder is first placed in a container. The gas pressure in the area of the container containing the powder is then increased to a level above atmospheric pressure at a rate sufficient to cause the powder to compact before a substantial portion of the pressurization gas diffuses into the powder. The particular level above atmospheric pressure to which the gas pressure must be increased and the corresponding rate of increase necessary to achieve a degree of compaction will vary depending upon the properties of the powder being densified, the amount of gas entrapped between the powder particles, and on the container used to carry out the process. Of course, the amount of gas pressure applied and the rate of increase in pressure will also depend upon the degree of compaction desired. Preferably and simply, the process involves increasing the pressure from an atmospheric pressure wherein the powder can be poured or flow by gravity into the container to a pressure greater than atmospheric pressure, which greater-than-atmospheric pressure can in turn be used to help expel the densified powder cleanly from the container into packaging, for example.

For example, as shown by Example I below, in order to increase the bulk density of a freshly milled, hot (150 to 200° C.) latex paint grade titanium dioxide pigment ("CR-813" marketed by Kerr-McGee Chemical, LLC) from 24.8 lbs/ft$^3$ (0.40 g/cm$^3$) to 41.7 lbs/ft$^3$ (0.67 g/cm$^3$) in a 3 liter cylindrical steel vessel having a 15.3 cm inside diameter and a height of 15.9 cm, the gas pressure in the area of the container containing the pigment (in this case the whole interior of the container) was increased from 0 psig to 50 psig (3.5 kg/sq. cm) in approximately 10 to 15 seconds. Similarly, as shown by Example V below, in order to increase the bulk density of a freshly dried and vacuum-densified lithium vanadium oxide battery-active material from 43.6 lbs/ft$^3$ (0.70 g/cm$^3$) to 50.5 lbs/ft$^3$ (0.81 g/cm$^3$) in the same 3 liter cylindrical steel vessel, the gas pressure in the area of the container containing the pigment (in this case the whole interior of the container) was increased from a full vacuum condition (less than about 0.1 psia) to 90 psig (6.3 kg/sq. cm) in about 15 seconds.

Generally, after the desired compaction is obtained, the container is depressurized and the compacted powder is removed from the container. In one embodiment, the container in which the powder is densified also serves as the final or at least interim container (e.g., packaging) for the product. In this event, of course, the compacted powder is not removed from the container. In fact additional powder can be added to the container and compacted in accordance with the invention, in one or more additional cycles.

In one embodiment, the gas pressure in the area of the container containing the powder is increased to a level above atmospheric pressure by injecting a gas into the container. For example, as illustrated above, gas can be injected into the container at a rate sufficient to increase the overall pressure within the container as a whole to the desired level within the desired amount of time in order to achieve compaction of the powder. The container is then depressurized and the compacted powder is removed from the container.

The pressurization gas can be any gas, but should not adversely react with the powder or otherwise negatively affect either the process or the apparatus to carry out the process. The pressurization gas can conceivably be selected to be reactive with the powder in an advantageous, desired way, in effect combining a reactive step in the powder's preparation (or treatment) with densification. However, for most applications it is expected that the pressurization gas should be non-reactive with the powder and in the process and apparatus generally. In densifying a lithium metal oxide battery-active material or like moisture- or oxygen-sensitive material, for example, an unreactive, dry gas such as nitrogen is suitably used as the pressurization gas. In the case of the densification of an aerated titanium dioxide powder, however, air is simply and preferably used as the pressurization gas. The gas can also conveniently be a gas that is otherwise present and readily available (perhaps in an already pressurized condition) in an associated process for making, treating or handling the aerated powder. For example, in the production of titanium dioxide pigment, chlorine gas is commonly utilized, generated and/or recycled. In an embodiment of the invention, the chlorine gas is utilized as the gas injected into the container to increase the gas pressure in the container and compact the powder.

A variety of methods can be utilized to depressurize the container and remove the compacted powder from the container. For example, in one embodiment, the powder is placed in a container having a first end and a second end opposing the first end. The container is configured such that increasing the gas pressure in the area of the container containing the powder to a level above atmospheric pressure causes the powder to compact against the second end of the container. Once the powder is compacted, the second end of the container is opened whereby the container is depressurized and the compacted powder is expelled from the container through the second end of the container.

Any aerated powder can be densified or compacted in accordance with the invention. Examples of commercially significant aerated powders are the titanium dioxide pigments and the complex metal oxides and metal phosphates used as battery-active materials, for example, those based on vanadium, manganese, nickel, cobalt, iron or a combination of such metals. Of particular interest are the lithium vanadium oxides, lithium cobalt oxides, lithium nickel and lithium manganese oxides (including the many modified oxides based on each of these). Examples of applications in which densification of such aerated powders may be beneficial include bulk bagging operations and operations to load battery-active materials into battery compartments of a limited volume.

One class of material to which the invention is particularly applicable is inorganic pigments. For example, due in part to a final fluid energy milling step, the bulk density of highly treated titanium dioxide pigment (for example, of a type designed for use in water-based latex paints) is so low that it is not uncommon that the container can only be filled to 80–90 percent capacity. Typically, the bulk density of highly treated, aerated titanium dioxide pigment is less than about 21.9 lbs/ft$^3$ (0.35 g/cm$^3$). In accordance with the invention, the bulk density of such a pigment can efficiently be increased to a level greater than about 49.9 lbs/ft$^3$ (0.8 g/cm$^3$).

The inventive densification process is particularly useful in connection with titanium dioxide pigments having bulk densities less than about 21.9 lbs/ft$^3$ (0.35 g/cm$^3$). Preferably, in accordance with the present invention, the bulk density of a titanium dioxide pigment is increased to a level greater than about 35 lbs/ft$^3$ (0.56 g/cm$^3$). More preferably, the bulk density of a titanium dioxide pigment is increased in accordance with the invention to a level in the range of from about 35 lbs/ft$^3$ (0.56 g/cm$^3$) to about 50 lbs/ft$^3$ (0.80 g/cm$^3$), even more preferably from about 40 lbs/ft$^3$ (0.64 g/cm$^3$) to about 50 lbs/ft$^3$ (0.80 g/cm$^3$).

In another aspect, the invention includes a process for preparing a slurry from an aerated powder. Due to the increased time required to "wet in" the powder into a liquid medium, preparing slurry from an aerated powder (and in particular, from a highly aerated powder) can be very time consuming. Although aerated powders naturally gravitationally settle over time, this adds another step between the final powder processing step and the slurry preparation process. In accordance with the invention, the powder is first processed. For example, this may entail a final powder milling (e.g., fluid energy milling) step which typically aerates the powder. Prior to allowing the powder to fully settle, the bulk density of the powder is increased by deaerating the powder. The densified powder is then wet in (dispersed) into the slurry. The resulting slurry can then be effectively and efficiently added to yet another medium such as a paint formulation.

Preferably, the powder is deaerated in accordance with the invention, namely placing the powder in a container under atmospheric conditions, increasing the gas pressure in the area of the container containing the powder to a level above atmospheric pressure at a rate sufficient to cause the powder to compact before a substantial portion of the pressurization gas diffuses into the powder and removing the compacted powder from the container.

In the titanium dioxide pigment industry, significant amounts of pigment are sold in a slurry format. These slurries are typically made at solids levels ranging from about 65% to about 76% by weight. To achieve these high solids levels, various dispersants are added to facilitate both rapid "wet-in" and to form a stable dispersion. The term "wet-in" refers to the displacement of the air surrounding the particles with a liquid. In highly aerated powders, occluded air can significantly increase the overall time required to complete the "wet-in" step. By densifying the pigment prior to initiating the dispersion process, the "wet-in" time can be significantly reduced. For example, the "wet-in" time associated with dispersing a titanium dioxide pigment into water to form a slurry is, by the present process, preferably reduced by at least 10 percent, more preferably at least 20 percent and most preferably by at least 30 percent in comparison to the amount of "wet-in" time required for the same pigment under the same conditions but wherein the pigment has only been allowed to deaerate naturally and with settling of the pigment.

The invention is also particularly useful for increasing the bulk density of battery-active materials and of compositions containing such materials, as used for making the cathode of a primary or secondary rechargeable battery, for example. It will be appreciated in this regard that with the advent of increasingly smaller yet more sophisticated hand-held electronic devices, the batteries used in such devices must be capable of delivering a correspondingly greater amount of electrical energy yet occupy a smaller space than in earlier such devices. The present invention addresses this need and helpfully enables a greater amount of a given battery-active material to be employed in the increasingly smaller, fixed volume battery containers or shells that are required. Preferably, by the process of the present invention, the bulk density of a battery-useful composition containing a battery-active material (or mixture of such materials) can be increased by at least about 10 percent, more preferably by at least about 15 percent and most preferably by at least about 30 percent from the bulk density of the same composition without any positive pressure densification or deaeration having been used.

The inventive process does not necessarily require sophisticated apparatus; any closed container should work provided the materials of construction are capable of sustaining both the desired operating pressures and a corrosive environment if corrosive materials are involved.

Figure 3:
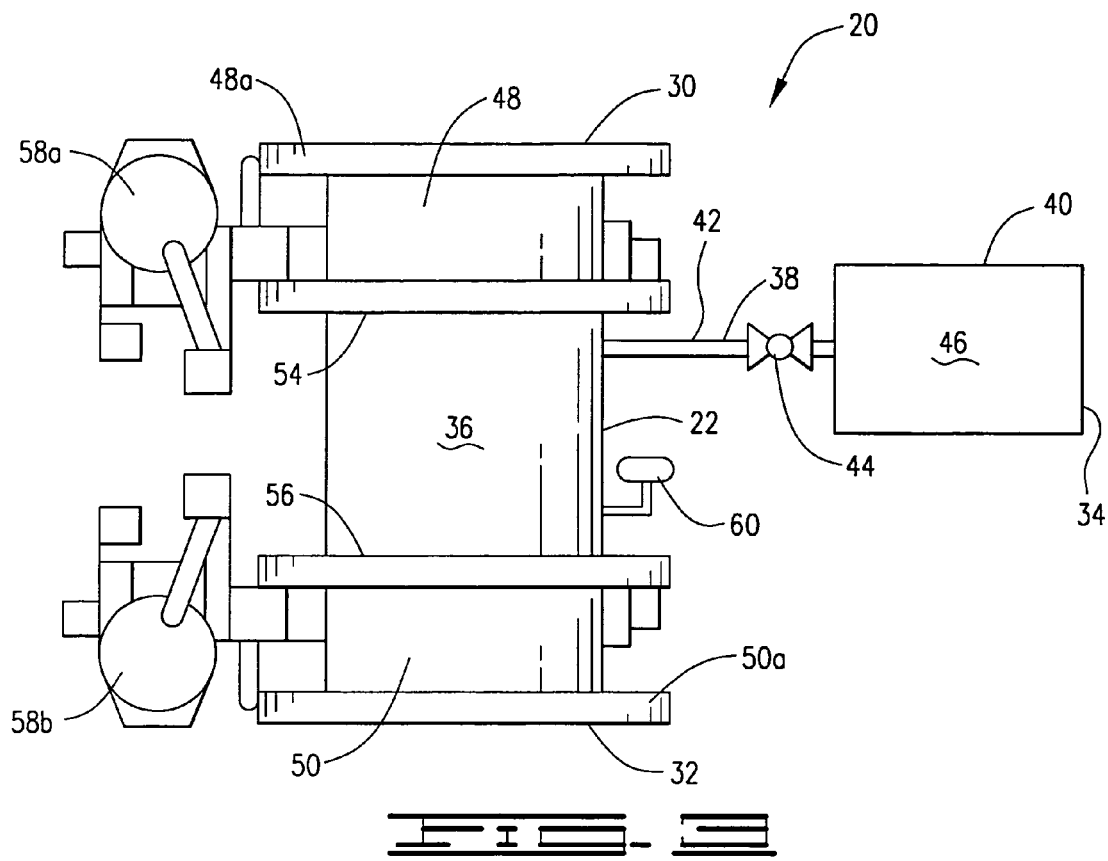
FIG. 3 is a side elevation view illustrating one embodiment of the inventive apparatus.
Figure 4:
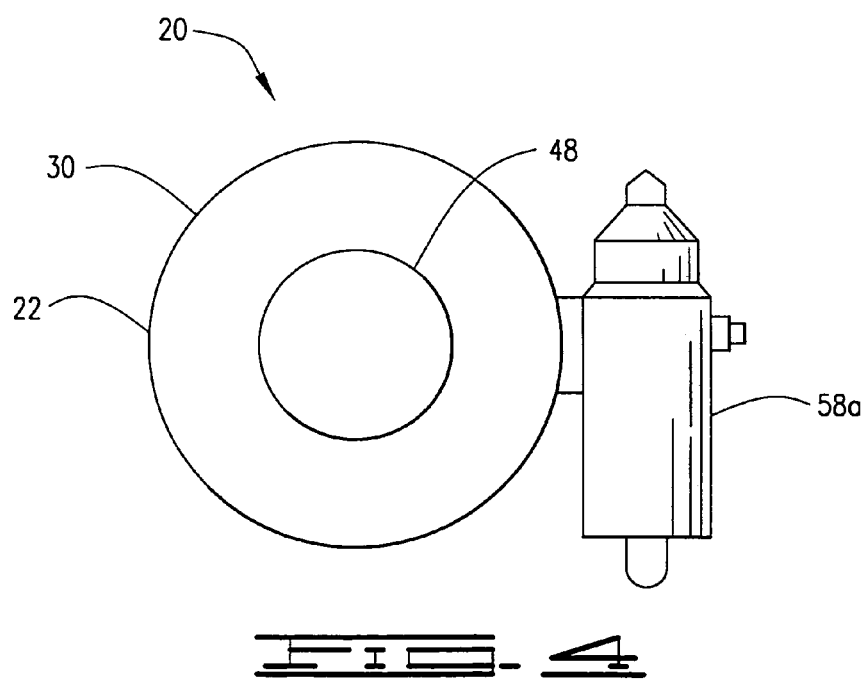
FIG. 4 is a top view of the apparatus illustrated by FIG. 3.
Figure 3:
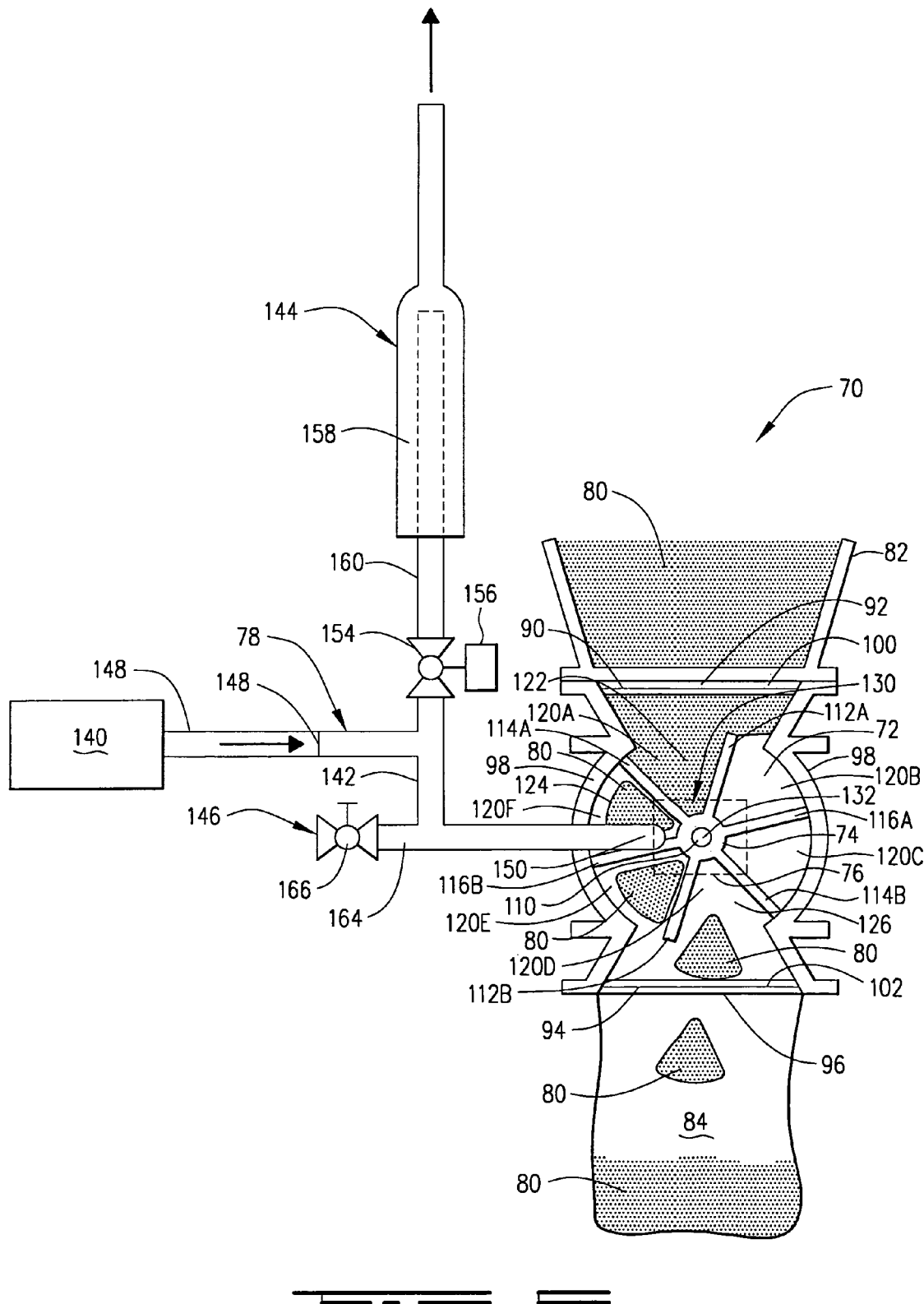

Referring now to the drawings, and particularly to FIGS. 3 and 4, one preferred embodiment of the inventive apparatus, generally designated by the reference numeral 20, is described. The apparatus 20, an air-lock assembly, can be utilized to increase the bulk density of any powder. The particular form of the apparatus 20 is not critical. In fact, there are a variety of spherical disk valves and air lock assemblies that are commercially available and can be modified for use in connection with the invention. The particular apparatus shown by FIGS. 3 and 4 is a GEMCO® Spherical Disc Valve or Airlock that has been modified in accordance with the invention.

The apparatus 20 is positioned in the vertical mode and comprises a container 22 for containing a powder under pressure. For example, in a continuous titanium dioxide manufacturing process, titanium dioxide pigment can be fed directly into the container 22 from a titanium dioxide separator (not shown).

The container 22 includes a first end 30 and an opposing second end 32. Pressurization means 34 are associated with the container 22 for increasing the gas pressure in the area 36 of the container 22 containing the powder to a level above atmospheric pressure and at a rate sufficient to cause the powder to compact before a substantial portion of the pressurization gas diffuses into the powder.

In one embodiment, pressurization means 34 comprise injection means 38 for injecting a gas into the container 22, and a source of gas 40 (e.g., compressed gas). The injection means 38 includes a conduit 42 extending from the source 40 into the container 22 and a corresponding valve 44. The source 40 of compressed gas includes a suitable container 46. The pressure of the gas in the container 46 is sufficient to force the gas through the conduit 42 into the container 22 at a rate sufficient to increase the gas pressure in the container 22 to the desired level and within the desired amount of time.

The first end 30 of the container 22 includes an inlet 48 for allowing the powder to be added to the container (the inlet includes a flange 48a for connection to the feed supply). The second end 32 of the container 22 includes an outlet 50 for allowing the powder to be discharged from the container into a bag or other receptacle (not shown) (the outlet includes a flange 50a for connection to the receptacle). The container further includes a first valve 54 for opening and closing the inlet 48 and a second valve 56 for opening and closing the outlet 50. As illustrated, the valves 54 and 56 are conventional sliding knife gate valves, which are automatically operated by corresponding valve motors 58a and 58b as known to those skilled in the art (e.g., the motors can be electrically or pneumatically operated; a programmable logic controller can be included to control cycle time). The valves 54 and 56 open and close very quickly allowing rapid filling and discharge from the container. One or more pressure valves 60 can be associated with the container 22 for indicating the pressure within the container 22.

In operation of the apparatus illustrated by FIGS. 3 and 4, the first valve 54 is opened and the powder to be densified is gravity fed into the container 22 through the inlet 48. The valve 56 remains fully closed. The powder falls and piles up against the valve 56. Once the container 22 is filled to the desired level, the valve 54 is closed. The valve 44 is then opened to inject pressurization gas from the source of gas 40 into the container 22. The pressurization gas within the source of gas 40 is compressed such that it is injected into the container 22 at a rate sufficient to increase the gas pressure in the container to the desired level, i.e., to a level above atmospheric pressure at a rate sufficient to cause the powder to compact whereby the powder is compacted or densified against the valve 56 of the container 22 before a substantial portion of the pressurization gas diffuses into the powder. Once the powder has been compacted as desired, the valve 56 is opened whereby gravity together with the increased gas pressure within the container 22 causes the powder to completely eject from the container 22. This is an added benefit of the invention, particularly in circumstances where the cohesive characteristics of some powders may cause these powders to tend to stick to the walls of the container 22 and not be easily removed to a separate package, for example. The increased gas pressure in the container 22 can help overcome the tendency of such powders to stick to the walls of the container 22. The compacted powder is directly ejected into a bag or other type of product receptacle (not shown). Preferably, no additional mechanical device is required to effect the discharge.

Figure 5:
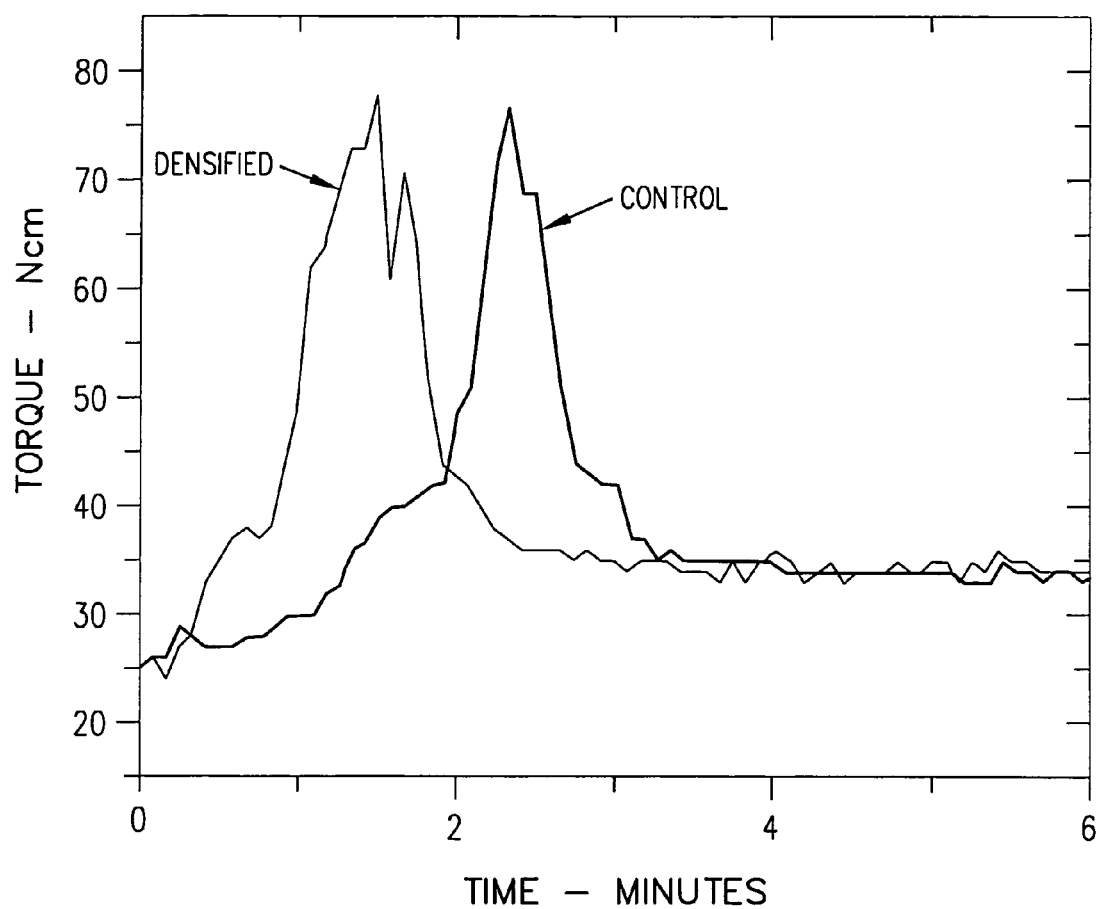
FIG. 5 is a front schematic and partially sectional view illustrating another embodiment of the inventive apparatus.

Referring now to FIG. 5, yet another embodiment of the inventive apparatus for increasing the bulk density of a powder is illustrated. The apparatus in this embodiment, which is generally designated by the reference numeral 70, includes a cylinder 72, a rotary containment device 74, rotating means 76 (represented by dotted lines) for turning the rotary containment device within the cylinder, and pressurization means 78 associated with the cylinder. A powder 80 is fed from a feed container 82 into the cylinder 72 and ultimately from the cylinder into an end-container (e.g., a bag) 84.

The cylinder 72 includes a first end 90 containing an inlet 92, a second end 94 opposing the first end and containing an outlet 96 and a wall 98. The inlet 92 includes a first valve 100. The outlet 96 includes a second valve 102. The rotary containment device 74 is positioned within the cylinder 72. The rotary containment device includes a hub 110 and three pairs of opposed blades, 112A and 112B, 114A and 114B and 116A and 116B, respectively, attached to the hub. The blades 112A and 112B, 114A and 114B and 116A and 116B create six powder containment areas 120A through 120F within the cylinder 72. The rotary containment device 74 is capable of turning within the cylinder 72 such that each of the powder containment areas 120A through 120F rotate to a first position 122 within the cylinder adjacent the inlet 92 whereby non-compacted powder 80 can be added to the area, a second position 124 within the cylinder adjacent the wall 98 of the cylinder whereby powder 80 in the area can be compacted, and a third position 126 adjacent the outlet 96 whereby compacted powder 80 can be ejected from the area into the end-container 84.

The rotating means 76 includes a motor 130 (represented by dotted lines) and shaft 132. The shaft 132 is attached at one end to the motor 130 and the other end to the hub 110. The motor 130 rotates the shaft 132, which in turns rotates the rotary containment device 74.

The pressurization means 78 associated with the cylinder 72 function to increase the gas pressure within each of the powder containment areas 120A through 120F of the rotary containment device 74 so that the powder within the area is compacted or densified when the area is in the second position 124. The gas pressure within each of the powder containment areas 120A through 120F is increased to a level above atmospheric pressure and at a rate sufficient to cause the powder within the area to compact before a substantial portion of the pressurization gas diffuses into the area. The pressurization means 78 include a pulsed air pressure control system 140, a main gas conduit 142, a filter and vent system 144 and a cleanout system 146. A first end 148 of the main gas conduit 142 is attached to the pulsed air pressure control system 140. A second end 150 of the main gas conduit 142 extends through the wall 98 of the cylinder 72 and is positioned in each of the powder containment areas 120A through 120F when the area is in the second position 124.

The filter and vent system 144 includes a valve 154, pressure gauge 156 and a bag-type filter 158. A first branch 160 of the main gas conduit 142 extends into the filter 158. The filter and vent system 144 allows gas to be vented from the pressurization means 78 as necessary.

A second branch 164 of the main gas conduit 142 extends into the cleanout system 146. The cleanout system 146 includes a valve 166 and allows any particles that become entrapped in the pressurization means 78 to be removed from the pressurization means.

In operation, powder 80 to be compacted is placed in the feed container 82. The rotating means 76 is operated to rotate the rotary containment device 74 in a counterclockwise direction within the cylinder 72 at the desired rate; i.e., a rate such that a proper amount of powder 80 will be fed into each of the powder containment areas 120A through 120F when the area is in the first position 122, and to allow the powder 80 in the area to be sufficiently compacted when the area is in the second position 124. The first valve 100 is then opened allowing non-compacted powder 80 to fill each of the powder containment areas 120A through 120F when the area is in the first position 122. As the rotary containment device rotates, each of the powder containment areas 120A through 120F moves from the first position 122 to the second position 124. When in the second position 124, the pressurization means 78 operates to increase the gas pressure within the corresponding powder containment area to the desired level above atmospheric pressure at a rate sufficient to cause the powder in the area to compact before a substantial portion of the pressurization gas diffuses into the powder. Rotation of the rotary containment device 74 causes each of the powder containment areas 120A through 120F to also rotate from the second position 124 to the third position 126. When a powder containment area is in the third position 126, the compacted powder therein falls from the area through the second valve 102 and outlet 96 into the end container or bag 84. Continuous operation of the device allows powder to be continuously densified in accordance with the invention.

The pressurization means 78 operates to increase the gas pressure within each of the powder containment areas 120A through 120F as follows: Air is injected into the main gas conduit 142 by the pulsed air pressure control system 140. The air is conducted by the main gas conduit 142 into the powder containment area in the second position 124. The air flows from the second end 150 of the main gas conduit 142 into the area in the second position. The pulsed air pressure control system 140 causes the air to be conducted through the main gas conduit 142 at a rate sufficient to increase the gas pressure in the powder containment area in the second position 124 to the desired level above atmospheric pressure and at the desired level and at the desired rate, i.e., a rate sufficient to cause the powder within the area to compact before a substantial portion of the pressurization gas diffuses into the powder.

The filter and vent system 144 allows air to be vented from the system when the pressure in the system, as indicated by the pressure gauge 156, exceeds the desired limit. The valve 154 is opened allowing excess air to travel through the first branch 160 of the conduit 142 into the filter 158 and ultimately into the atmosphere. The filter 158 catches any particles present in the vent gas.

The cleanout system 146 allows any powder that accumulates in the main gas conduit 142 or other parts of the pressurization means 78 to be removed from the system. The valve 146 is opened allowing air and particles in the main gas conduit 142 to enter the second branch 164 of the conduit where it is conducted through the valve and collected in an appropriate manner.

The following examples are provided to further illustrate the effectiveness of the inventive method and composition.

EXAMPLE I

A set of experiments was carried out to verify that rapid pressurization of a closed vessel containing a highly aerated powder causes the powder to densify or compact (i.e., forces the powder into a smaller volume). All four combinations of rapid and slow pressurization and rapid and slow depressurization were evaluated. Bulk density values were determined in a conventional manner using a "HOSOKAWA Micron Powder Tester, Model PT-E," by filling and leveling a 100 cubic centimeter cup with the powder, attaching an extension piece on top of the cup and filling the extension piece as well. The filled cup and extension piece were tapped for 180 seconds at a 60 cycle frequency, with the addition of powder as necessary to keep the level of the powder above the top of the cup. At the conclusion of the tapping cycle, the extension was carefully removed and the cup leveled to remove excess powder. The weight difference between the filled, tapped and leveled cup and the empty cup in grams, divided by the 100 cubic centimeter volume of the cup, provided the sample bulk density in grams per cubic centimeter.

The powder used in the tests was a highly aerated, latex paint grade titanium dioxide pigment ("CR-813" pigment sold by Kerr-McGee Chemical, LLC). First, the pigment was milled in a fluid energy mill using superheated steam which aerated the pigment and raised the temperature of the pigment to approximately 150–200° C. The bulk density of this pigment, prior to testing, was 24.8 lbs/ft$^3$ (0.40 g/cm$^3$). Approximately 500 grams of the hot pigment were then placed into a 3 liter, cylindrical steel vessel (15.3 cm inside diameter, 15.9 cm in height) having a removable top. The top of the vessel was then attached securely. A first valve attached to the top of the vessel and connected to a compressed air line was opened thereby causing the vessel to pressurize from zero psig to approximately 50 psig (3.5 kg/sq. cm, gauge) within 10 to 15 seconds. Once the pressure reached the level of approximately 50 psig, the first valve was closed and a second valve, also attached to the top of the vessel, was opened. Opening of the second valve allowed the vessel to equilibrate back to atmospheric pressure in approximately 10 to 15 seconds. The top of the vessel was then removed and the pigment was recovered from the vessel. The bulk density of the recovered pigment (Sample 1A) was determined to be 41.7 lbs/ft$^3$ (0.67 g/cm$^3$). Thus, the bulk density of the pigment substantially increased, specifically by 68 percent.

Next, the experiment described above was repeated using the same procedure and a fresh sample of the same hot pigment. The only exception was that the pressure in the vessel was allowed to climb to 50 psig over 3 minutes, as opposed to 10 to 15 seconds, and was allowed to equilibrate back to atmospheric pressure over a one minute time frame, as opposed to a 10 to 15 second time frame. The bulk density of the recovered pigment (Sample 1B) was determined to be 26.6 lbs/ft$^3$ (0.43 g/cm$^3$), almost the same as the starting material.

A third test was carried out, also utilizing the same equipment and procedure and a fresh sample of the same hot pigment. In this test, however, the vessel was pressurized rapidly but depressurized slowly. Specifically, the pressure in the vessel was allowed to climb to approximately 50 psig over 10 to 15 seconds and then allowed to equilibrate back to atmospheric pressure over approximately a one-minute time frame. The bulk density of the recovered pigment (Sample 1C) was determined to be 41.7 lbs/ft$^3$ (0.67 g/cm$^3$), which is equal to the level achieved in connection with Sample 1A.

A fourth example was carried out to illustrate the effect of initially pressurizing the vessel slowly but depressurizing the vessel rapidly. Again, the test was carried out using the same equipment and procedure as above and a fresh sample of the hot pigment. In this test, however, the pressure was allowed to climb to approximately 50 psig over three minutes and to then dissipate over a 30-second time frame. The bulk density of the recovered pigment (Sample 1D) was determined to be 29.7 lbs/ft$^3$ (0.47 g/cm$^3$), which was only slightly higher than the starting material.

The results of the above experiments unequivocally show that it is rapid pressurization of the vessel that is responsible for significantly densifying the pigments.

EXAMPLE II

The pigment densified in accordance with Example I (Sample 1A) was tested in paint formulations to verify that densification accomplished by means of the present invention does not negatively impact the optical properties of the pigment. A paint formulation containing pigment Sample 1A (having a bulk density of approximately 41.7 lbs/ft$^3$ (0.67 g/cm$^3$)) and a paint formulation including the pigment prior to being treated in accordance with the inventive process (having a bulk density of 24.8 lbs/ft$^3$ (0.40 g/cm$^3$)) (the "untreated pigment sample") were tested.

The paint formulations were standard latex paint formulations, designed for interior architectural applications. The formulations were formed by incorporating the pigment samples in portions of a freshly prepared polyvinyl acetate latex emulsion. In each formulation, the amount of the pigment sample incorporated into the emulsion was 60% by volume based on the total volume of the emulsion.

The resulting paint formulations were first applied to black glass plates and white cards. The Y reflectance values of the dried paint films were measured with a HunterLab Color Difference Meter as known to those skilled in the art. These readings, in combination with measured film weights, were used to calculate the scatter value, expressed as hiding power in square feet per pound of pigment.

Next, a fixed amount of a carbon black tint was added to a portion of each paint formulation to form a tinted paint sample for each formulation. The four paint samples were mixed thoroughly. Drawdowns of all four paint samples and of corresponding controls were then made on standard LENETA™ charts. From these drawdowns readings from the HunterLab Color Difference Meter were obtained to enable tint strength calculations to be made. All methods and calculations were carried out in accordance with ASTM D2805 and D2745, respectively. The results are shown in Table 1 below.

TABLE 1

Optical Properties of Paint Formulations

| Test Method | Paint with Untreated Pigment Sample | Paint with Pigment Sample A |
|---|---|---|
| Hiding Power (sq. ft/lb of pigment) | 221 | 222 |
| Tint Strength (% of Standard) | 106.6 | 108.6 |

The results of the tests show that there was no deterioration in the performance of the pigment densified in Example I whether in terms of hiding power (dryhide) or tint strength.

EXAMPLE III

The effect of varying the densification pressure on the bulk density of the pigment was demonstrated. The pigment used in this series of tests was a highly aerated, latex paint grade titanium dioxide pigment ("CR-813" sold by Kerr-McGee Chemical, LLC). Six samples of the pigment, including a control, were tested.

First, five of the six samples of the pigment were densified utilizing the same process, apparatus and equipment described in Example I. Except for the densification pressure utilized, the test parameters in each experiment were the same. In each test, the vessel was rapidly pressurized to the target pressure level within approximately 3–5 seconds. Upon obtaining the target pressure level, the vessel was allowed to equilibrate back to atmospheric pressure over approximately 10–15 seconds. The densification pressures used in the densification process ranged from 15 psig (1 kg/sq. cm) to 72 psig (5 kg/sq. cm). The bulk density of each pigment sample, including the control sample, was determined as in Example I.

Paint formulations utilizing the control sample as well as the five samples densified in accordance with the inventive process were then made. The same formulations, equipment and procedure described in Example II were utilized. The hiding power and tint strength of the samples were then measured utilizing the same procedure described in Example II. The results of the tests are shown in Table 2 below.

TABLE 2

Effective of Densification Pressure on Optical Properties of Paint Formulations

| Sample | Pressure psig | Bulk Density lbs/ft$^3$ | Hiding Power (sq. ft./lb Pigment) | Tint Strength (% of Standard) |
|---|---|---|---|---|
| 3A | 0 | 24.9 | 213 | 106.8 |
| 3B | 15 | 27.7 | 213 | 105.4 |
| 3C | 30 | 35.4 | 213 | 106.9 |
| 3D | 45 | 39.0 | 214 | 106.4 |
| 3E | 60 | 40.0 | 213 | 104.6 |
| 3F | 72 | 42.8 | 213 | 104.9 |

The bulk density measurements demonstrate that the bulk density of the pigment increases with increasing densification pressure. Optical properties as measured by hiding power and tinting strength show no change over the range of densification pressures evaluated. The tests show that the pigment can be densified very significantly (from 24.9 to 42.8 lbs/ft$^3$, which represents an increase of almost 72%) without affecting the optical properties of paint formulations formed therewith.

EXAMPLE IV

A test was carried out to illustrate the beneficial effects that the inventive densification process and apparatus have on the rate that a powder can be dispersed into an aqueous medium. The pigment used in the test was the same pigment described in Example III above. The pigment was fresh from a fluid energy milling step of the pigment manufacturing process. Bulk density values were determined as in Example I.

Two samples were made, the first to be used as a control. The second sample was densified utilizing the same procedure and apparatus described in Example I; in this case pressurization was to approximately 50 psig within 3–5 seconds and depressurization was carried out over a time period of 10–15 seconds. Bulk density measurements showed that the control had a value of 27.1 lbs/ft$^3$ (0.43 g/cm$^3$) and the densified sample had a value of 40.0 lbs/ft$^3$ (0.64 g/cm$^3$, for an increase of almost 48%).

Next, using a DISPERMAT™ Model AE3C available from Byk-Gardner, U.S.A., equipped with torque sensing capability, slurries were made from each of the two pigment samples. The technique involved adding 775 grams of the pigment sample being tested to 370 grams of water and a proprietary blend of dispersants. All operational parameters such as speed and temperature were maintained at a constant level. The method of addition of the pigment to the aqueous medium was such that the only rate limiting factor was the ability of the titanium dioxide to "wet-in" to the slurry.

The results are demonstrated by FIG. 6 of the drawings of this application. FIG. 6 includes time-torque plots showing both the sample densified in accordance with the invention and the control sample. As shown, the pigment sample densified in accordance with the invention reached a steady state torque 50 to 52 seconds before the control. Thus, the ability of a powder to be dispersed in an aqueous medium can be substantially enhanced by densifying the powder in accordance with the invention.

EXAMPLE V

A pressure densification test was run on a cathode composition comprised of a lithium vanadium oxide battery-active material and about 5 percent by weight of a combination of graphite and carbon black, which composition had been previously dried and densified under vacuum only. A sample was placed into the same 3 liter steel test cylinder described in Example I and full vacuum (to less than 0.1 psia) was applied. The cylinder was then pressurized to 90 psig (6.3 kg/sq. cm) in about 15 seconds with nitrogen. The packed bulk (tap) density increased from a nominal 43.6 lbs/ft$^3$ (0.70 g/cm$^3$) to 50.5 lbs/ft$^3$ (0.81 g/cm$^3$), about a 15% increase in density.

EXAMPLES VI THROUGH VIII

For Examples VI through VIII, similar pressure densification tests were conducted on two samples each of three additional battery-useful, cathode compositions, all comprised of lithium vanadium oxide battery-active material, carbon black and graphite. The compositions of the samples used for Examples VI and VII were the same, while the composition for Example VIII used a somewhat greater proportion of graphite as compared to carbon black.

In contrast to Example V, a vacuum was not applied initially, so that pressurization took place with nitrogen from atmospheric pressure to 90 psig over about 15 seconds. The valve to the container was then opened, and the pressure rapidly released over a span of about 5 seconds. Also in contrast to previous examples, in Examples VI through VIII the samples were subjected to the same densification procedure twice more to achieve maximum densification, before the packed bulk (tap) density was determined. Results are presented below in Table 3, with the densities being expressed in grams per cubic centimeter:

TABLE 3

| Sample | Density | Density after Densification | Avg. Percent Densification |
|---|---|---|---|
| 1A | 0.72 | 0.77 | 10.2 |
| 1B | 0.67 | 0.76 | |
| 2A | 0.59 | 0.70 | 16.8 |
| 2B | 0.60 | 0.69 | |
| 3A | 0.61 | 0.84 | 33.9 |
| 3B | 0.63 | 0.82 | |

Thus, significant improvements in the bulk densities of the samples were achieved.

What is claimed is:

1. An apparatus for increasing the bulk density of a powder, comprising:

a container for containing said powder under pressure, said container having an internal area containing said powder, a first end and a second end opposing said first end; and pressurization means associated with the internal area of said container containing said powder, said pressurization means injects a pressurized gas into the internal area to rapidly increase internal gas pressure in the internal area of said container containing said powder to a level above atmospheric pressure and thereby compacting said powder, other than by decreasing the volume of the internal area of the container containing said powder, at a rate sufficient to cause said powder to compact before a substantial portion of the gas in the internal area of said container containing said powder diffuses into said powder, wherein said powder is compacted by the rapid increase of internal gas pressure without the use of any mechanical device applied to said powder;

said container having a first end including an inlet for allowing said powder to be added to said container and a second end opposing said first end, said second end including an outlet for depressurizing said container and for removing said powder from said container, said container comprising a first valve for opening and closing said inlet and a second valve for opening and closing said outlet, whereby depressurization of said container and gravity expels said powder from said container through said outlet of said container.

2. The apparatus of claim 1 wherein said source of gas provides a gas selected from the group consisting of an inert gas, air, nitrogen, oxygen, carbon dioxide and chlorine gas.

3. The apparatus of claim 1 wherein said pressurization means causes said powder to compact against said outlet when said outlet is closed.

4. A process for increasing the bulk density of an aerated powder, comprising:

placing said powder into a container, said container having an internal area containing said powder, a first end and a second end opposing said first end;

compacting said powder against said second end solely by injecting a pressurized gas into said internal area to rapidly increase internal gas pressure in the internal area of said container containing said powder to a level above atmospheric pressure at a rate sufficient to cause said powder to compact against said second end of said container, wherein said powder is compacted against said second end by the rapid increase of internal gas pressure without the use of any mechanical device applied to said powder;

depressurizing and emptying said container by opening said second end of said container whereby depressurization of said container and gravity expels said powder from said container through said second end of said container.

5. The process of claim 4 wherein said gas injected into said container is selected from the group consisting of an inert gas, air, nitrogen, oxygen, carbon dioxide and chlorine.

6. The process of claim 4 wherein said powder is an inorganic metal oxide.

7. The process of claim 4 wherein said powder is a titanium dioxide pigment.

8. The process of claim 7 wherein the bulk density of said titanium dioxide pigment is increased to a level greater than about 35 lbs/ft$^3$.

9. The process of claim 7 wherein the bulk density of said titanium dioxide pigment is increased to a level in the range of from about 40 lbs/ft$^3$ to about 50 lbs/ft$^3$.

10. The process of claim 4 wherein said powder comprises a battery-active material.

11. The process of claim 10 wherein said battery-active material is selected from the group of metal oxides and metal phosphates wherein said metal is vanadium, manganese, nickel, cobalt, iron or a combination thereof.

12. The process of claim 10 wherein said battery-active material is selected from the group of lithium metal oxides and lithium metal phosphates wherein said metal is vanadium, manganese, nickel, cobalt, iron or a combination thereof.

13. The process of claim 10 wherein the bulk density of said battery-active material is increased by at least about 10 percent.

14. The process of claim 10 wherein the bulk density of said battery-active material is increased by at least about 15 percent.

15. A process for increasing the bulk density of an aerated powder, comprising:

placing said powder into a container, said container having an internal area containing said powder, a first end and a second end opposing said first end, and a valve associated with said second end for emptying said container;

compacting said powder against said second end solely by injecting a pressurized gas into the internal area to rapidly increase internal gas pressure in the internal area of said container to a level above atmospheric pressure, wherein said pressurization does not decrease the overall volume of the internal area of said container containing said powder, said pressurization occurs at a rate sufficient to cause said powder to compact against said second end of said container, wherein said powder is compacted against said second end by the rapid increase of internal gas pressure without the use of any mechanical device applied to said powder;

depressurizing and emptying said container by opening said valve associated with said second end of said container whereby depressurization of said container and gravity expels said powder from said container through said second end of said container.

16. The process of claim 15 wherein said gas injected into said container is selected from the group consisting of an inert gas, air, nitrogen, oxygen, carbon dioxide and chlorine.

17. The process of claim 15 wherein said powder is an inorganic metal oxide.

18. The process of claim 15 wherein said powder is a titanium dioxide pigment.

19. The process of claim 18 wherein the bulk density of said titanium dioxide pigment is increased to a level greater than about 35 lbs/ft$^3$.

20. The process of claim 15 wherein said powder comprises a battery-active material.

21. The process of claim 20 wherein said battery-active material is selected from the group of metal oxides and metal phosphates wherein said metal is vanadium, manganese, nickel, cobalt, iron or a combination thereof.

22. The process of claim 20 wherein said battery-active material is selected from the group of lithium metal oxides and lithium metal phosphates wherein said metal is vanadium, manganese, nickel, cobalt, iron or a combination thereof.

23. The process of claim 20 wherein the bulk density of said battery-active material is increased by at least about 10 percent.

* * * * *